US006816801B2

United States Patent
Rubis et al.

(10) Patent No.: US 6,816,801 B2
(45) Date of Patent: Nov. 9, 2004

(54) DIRECT DATA BUS INSTRUMENT

(75) Inventors: John Rubis, Lititz, PA (US); Dennis A. Roberts, Lancaster, PA (US)

(73) Assignee: Maxima Technologies & Systems, Inc., Lancaster, PA (US)

( * ) Notice: Subject to any disclaimer, the term of this patent is extended or adjusted under 35 U.S.C. 154(b) by 0 days.

(21) Appl. No.: 10/615,251

(22) Filed: Jul. 8, 2003

(65) Prior Publication Data

US 2004/0006449 A1 Jan. 8, 2004

Related U.S. Application Data

(60) Provisional application No. 60/394,522, filed on Jul. 8, 2002.

(51) Int. Cl.[7] .............................................. G06M 11/04
(52) U.S. Cl. ......................... 702/127; 702/88; 340/459; 340/525; 701/29
(58) Field of Search .................... 702/88, 127; 340/525, 340/459; 701/29

(56) References Cited

U.S. PATENT DOCUMENTS

| | | | | |
|---|---|---|---|---|
| 4,804,937 A | * | 2/1989 | Barbiaux et al. | 340/459 |
| 4,939,675 A | * | 7/1990 | Luitje | 702/88 |
| 5,432,497 A | * | 7/1995 | Briski et al. | 340/525 |
| 6,263,269 B1 | * | 7/2001 | Dannenberg | 701/29 |

* cited by examiner

Primary Examiner—John Barlow
Assistant Examiner—Stephen J. Cherry
(74) Attorney, Agent, or Firm—Barley Snyder

(57) ABSTRACT

A system and method for displaying monitored measurements of an apparatus on an instrument including a data bus interface, a data bus, and a plurality of instruments. The data bus interface is coupled to a data bus of the apparatus, which contains measurement data monitored by sensors in the apparatus. Each of the instruments each having a microcontroller coupled to the data bus interface. A motor is driven by the microcontroller and an indicator needle is coupled to the motor for displaying the measurement of the instrument. A warning light indicator is coupled to and driven by the microcontroller. The microcontroller monitors the rate of change of the measurement being displayed on the instrument and enters into a power down mode when the rate of change is below a given threshold.

33 Claims, 6 Drawing Sheets

DIRECT DATA BUS INSTRUMENT

CROSS REFERENCE TO RELATED APPLICATION

This reference claims the benefit of U.S. Provisional Application Ser. No. 60/394,522, filed Jul. 8, 2002.

FIELD OF THE INVENTION

The invention relates to instrumentation and, more particularly, to instruments for displaying measurements from data that is available on a vehicle or equipment data bus.

BACKGROUND OF THE INVENTION

Instruments are used to indicate various measurements during the operation of an apparatus such as a vehicle or other machinery. The instruments may be used for indicating pressure, temperature, liquid level, rotations per minute (RPM) and various other measurements that are monitored during the operation of the apparatus. These instruments are well known in the art and are supplied in several varieties including analog and digital gauges. The analog gauges typically operate using an analog signal emanating from a sensor or sender that drives a needle on the gauge to indicate the measurement. The digital gauges are typically driven by signals emanating from a sender or sensor that have passed through an analog to digital conversion in order to supply a digital signal to the gauge.

The digital signals produced from the analog to digital conversion may also be applied to an onboard data bus. In a vehicle, for example, the onboard data bus serves to provide data to microprocessors connected to the data bus for monitoring vehicle performance. In addition to monitoring, the microprocessors connected to the onboard data bus are capable of adjusting various parameters in order to enhance the vehicle performance. In addition to providing monitoring for controlling and adjusting the vehicle performance, the onboard data bus has also been used to display selected measurements to an operator of the vehicle. A typical architecture for such a system includes a central controller that is a stand alone component connected to the onboard vehicle data bus. The central controller includes a plurality of outputs each for driving a selected instrument. The central controller gathers data from the onboard data bus and outputs either digital or analog signals to drive each instrument. While it is desirable to utilize the onboard data bus for driving instruments such as gauges, it is also desirable to minimize the number of components in the architecture. It is further desirable to maintain the power consumption of the system at minimum levels.

SUMMARY OF THE INVENTION

It is therefore an object of the present invention to provide a system and components wherein each instrument is connectable directly to a vehicle data bus without the need for a central controller while maintaining power consumption at a minimum. The system and method according to the present invention displays monitored measurements of an apparatus on an instrument and includes a data bus interface, a data bus, and a plurality of instruments. The data bus interface is coupled to a data bus of the apparatus, which contains measurement data monitored by sensors in the apparatus. Each of the instruments has a microcontroller coupled to the data bus interface. A motor is driven by the microcontroller and an indicator needle is coupled to the motor for displaying the measurement of the instrument.

BRIEF DESCRIPTION OF THE DRAWINGS

FIGS. 2A and 2B show a schematic circuit diagram of a microcontroller and motor; FIG. 2C shows a schematic circuit diagram of a first embodiment of the data bus interface; and FIG. 2D shows a schematic circuit diagram of a second embodiment of the data bus interface.

DETAILED DESCRIPTION OF THE INVENTION

Figure 1:
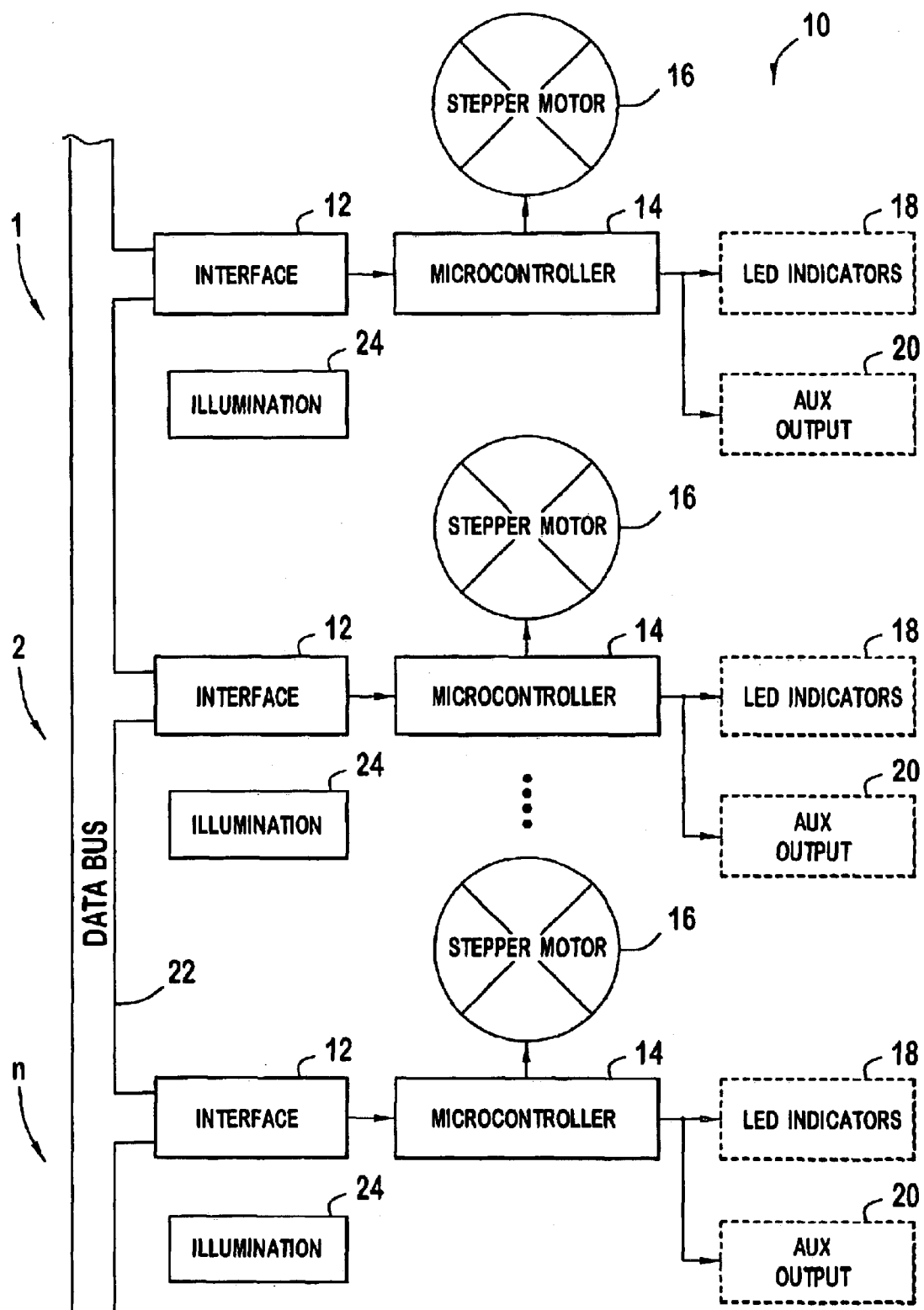
FIG. 1 is a block diagram of a measurement system according to the present invention.

The invention will first be described generally with reference to FIG. 1, which shows a block diagram of a measurement system 10. The measurement system 10 has a plurality of instruments 1, 2 . . . n, which in this example are gauges. The gauges may indicate various measurements, such as, pressure, temperature, liquid level, rotations per minute (RPMs), etc. Each of the instruments 1, 2 . . . n has three major components. It should be understood that each of the instruments 1, 2 . . . n is the same and, therefore, only one of the instruments 1, 2 . . . n will be described in detail herein. Each of the instruments 1, 2 . . . n has a data bus interface 12 coupled to a data bus 22 of an apparatus, which in this example is a vehicle. A microcontroller 14 is coupled to the data bus interface 12 and receives measurement data from the data bus 22 through the data bus interface 12. The microcontroller 14 drives a motor 16, which in this example is a stepper motor. A shaft (not shown) of the motor 16 is coupled to a needle that rotates with the shaft to indicate a measurement from the data bus 22. The microcontroller 14 may optionally drive light indicators 18, such as, warning light indicators, in addition to the motor 16. An auxiliary output 20 may also be provided to drive other external light indicators or alarms. The instruments 1, 2 . . . n may optionally also be provided with illumination 24, for example, by a light emitting diode (LED) back light.

Figure 2A:
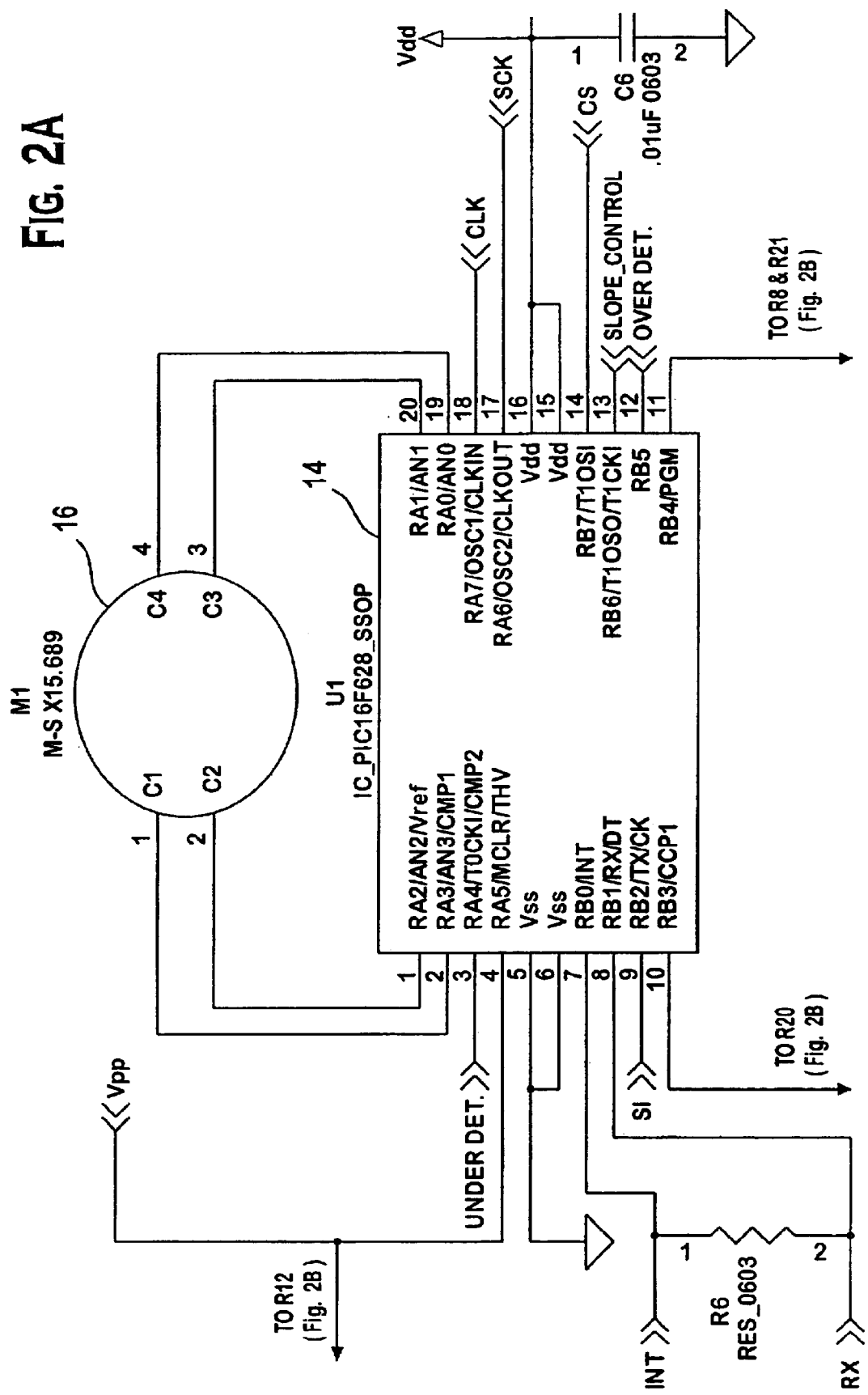
FIGS. 2A–2D show a schematic circuit diagram of an instrument for use in the measurement system of FIG. 1.
Figure 2B:
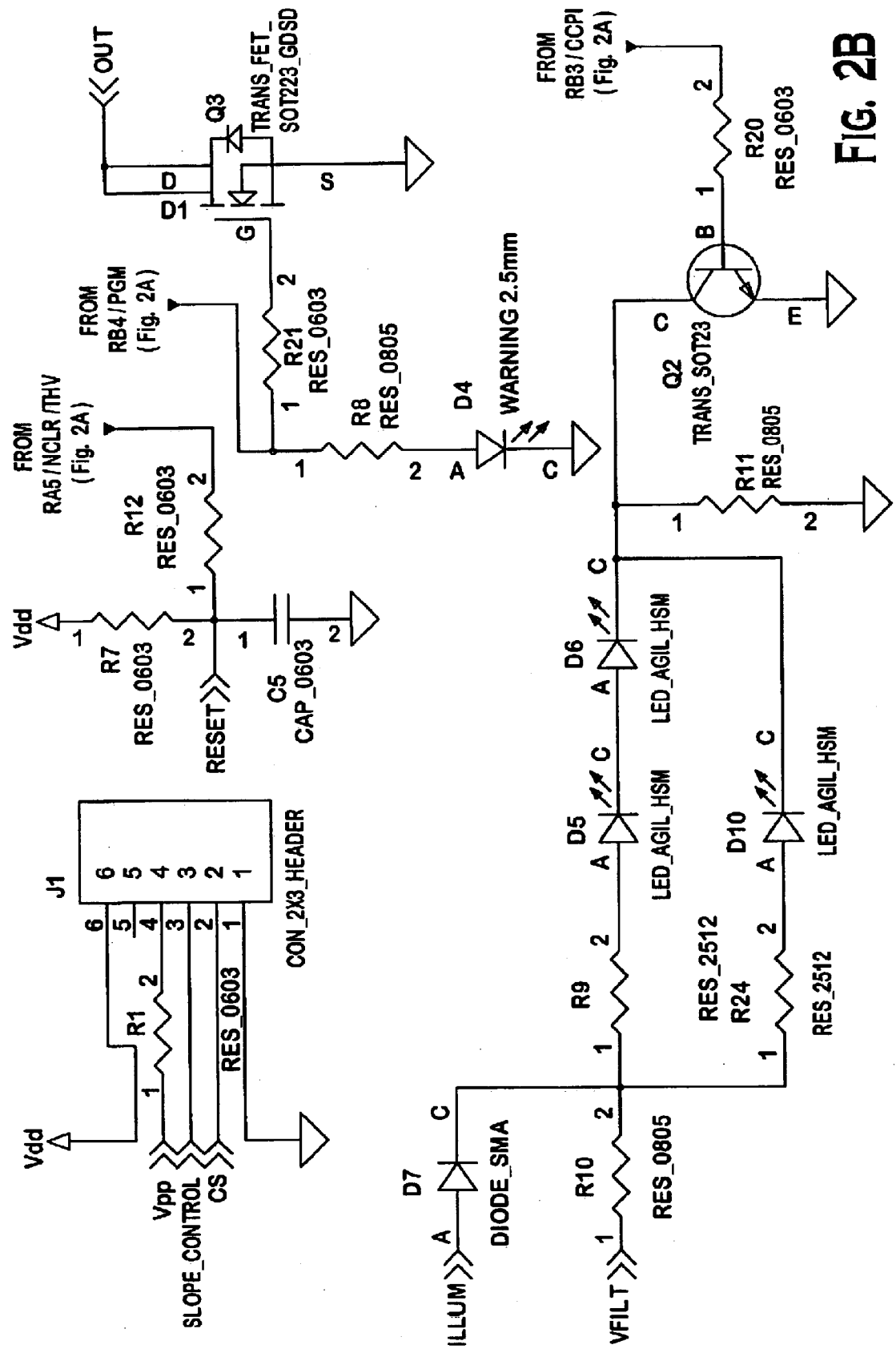
Figure 2C:
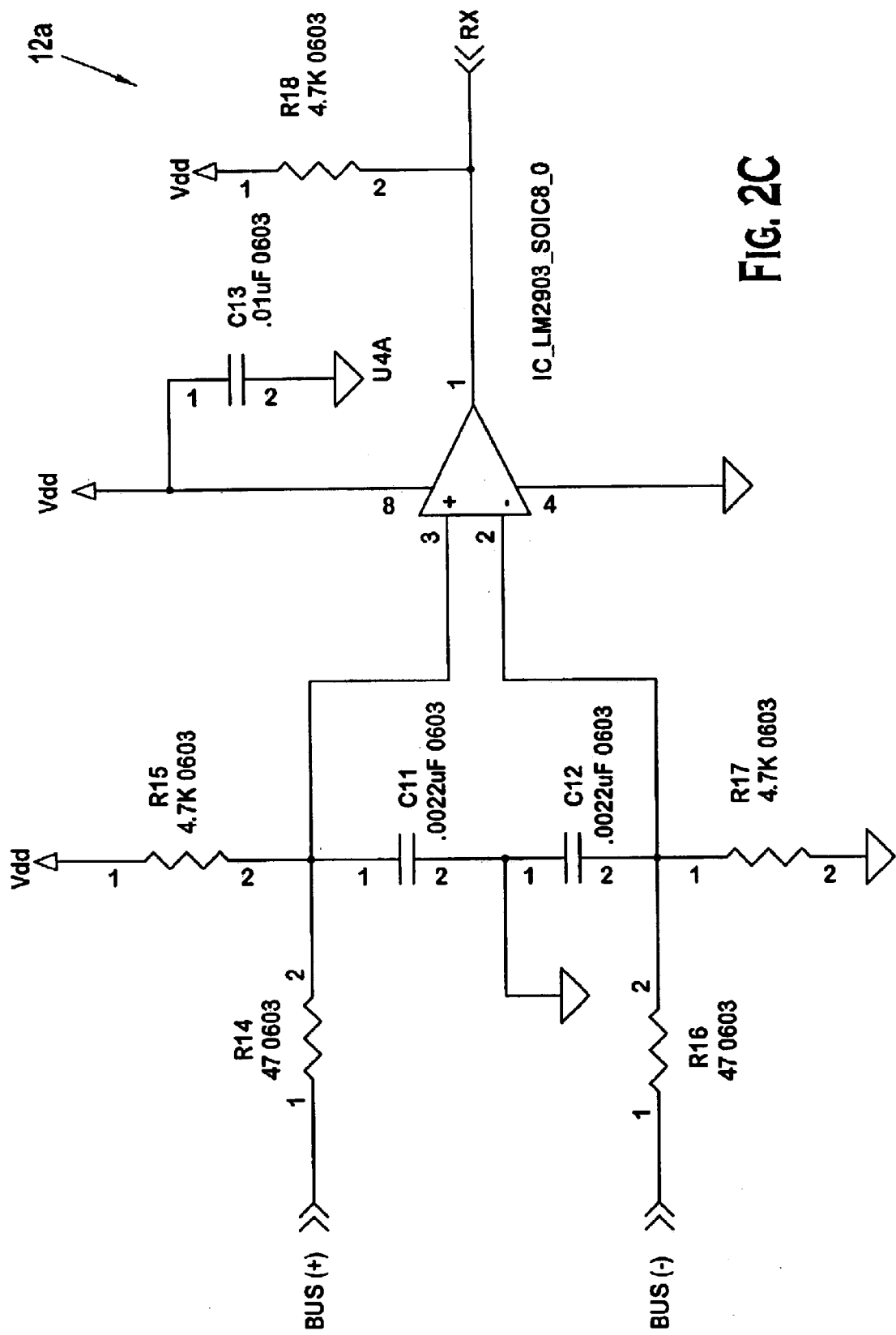
Figure 2D:
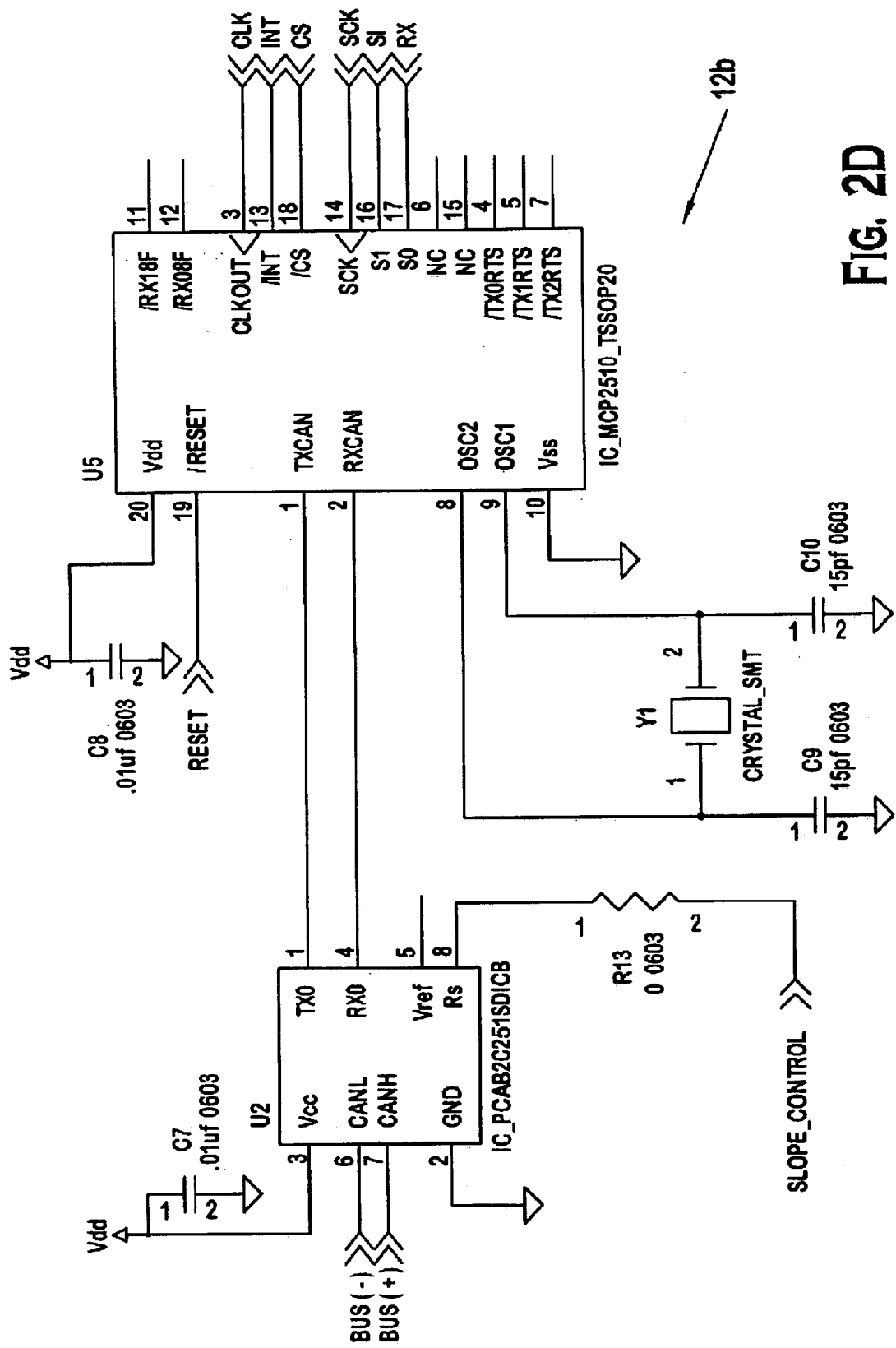

Each of the major components will now be described in greater detail with reference to FIGS. 2A–2D, which shows a schematic circuit diagram of the instruments 1, 2 . . . n used in the measurement system of FIG. 1. As shown in FIGS. 2A and 2B, the microcontroller 14 may be an eight-bit microcontroller. The microcontroller 14 has a plurality of pins 1 through 20. The microcontroller 14 receives RX from the data bus interface 12 at the pin 8. FIGS. 2C and 2D show two alternate embodiments of the data bus interface 12, data bus interface 12a and 12b. In the first embodiment shown in FIG. 2C, the data bus interface 12a is a SAE J1708 or SAE J1587 interface. The data bus 22 is coupled to BUS(+) and BUS(−). The data bus signal is then amplified through amplifier U4A and output to the RX. The microcontroller 14 receives the RX at the pin 8.

In the second embodiment shown in FIG. 2D, the data bus interface 12b is a SAE J1939 interface. In the data bus interface 12b, the data bus 22 is coupled to pins 6 and 7 of bus drive CAN U2. Bus signals are fed from pins 1 and 4 of CAN U2 to pins 1 and 2 of bus controller CAN U5. The output of CAN U5 is supplied to the RX. The microcontroller 14 receives the RX at the pin 8.

The microcontroller 14 drives the motor 16 from the pins 1, 2, 19, and 20. The pins 1, 2, 19, and 20 are connected to drive coil pins C2, C1, C4, and C3, respectively. The motor 16 contains two drive coils (not shown). The drive coil pins C1 and C2 are connected to opposite ends of the first drive coil. The drive coil pins C3 and C4 are connected to opposite ends of the second drive coil. The microcontroller 14 drives current through the coil of the motor 16 by applying five volts DC to one end of the coil while simultaneously applying a zero volt potential to the other end.

The pins 7, 8, 9, 14, 17, and 18 perform control and communication functions between the microcontroller 14 and the CAN U5. The pin 17 is connected to the SCK (shift clock) input of the CAN U5. The pin 18 is connected to the CLK input of the CAN U5. The pin 7 is connected to the interrupt output of the CAN U5 to alert the microcontroller 14 to incoming messages. The pin 8 is connected to the SO (shift out) pin of the CAN U5 to receive the incoming CAN data. The pin 8 is also connected to the data bus interface 12a, 12b, as described above, and receives the RX when the microcontroller 14 is configured to work with the data bus 22. The pin 9 is connected to a SI (shift in) pin of the CAN U5. The pin 14 is connected to a CS (chip select) input of the CAN U5.

The pin 3 is connected to an unregulated power supply input. When voltage drops below the logic threshold defined by the microcontroller 14, microcontroller software drives the needle to its zero (or home) position. The pin 4 is connected to a resistor-capacitor network that applies a voltage step on power up. The microcontroller 14 resets the microcontroller software when the voltage step is applied. The pin 12 is connected to the unregulated input voltage to detect an over-voltage condition. The microcontroller 14 turns off as many current-drawing peripheral devices as possible in an over-voltage condition to prevent current and heating stress on the power supply components.

The pin 10 drives the illumination 24 and is connected to an illumination LED drive transistor to provide lighting control through pulse-width power modulation. A warning circuit is also provided to drive the light indicators 18 from output OUT connected to transistor Q3. The transistor Q3 is driven by a signal from the pin 11 of the microcontroller 14. The pin 11 is connected to the light indicators 18 and the auxiliary output 20. The pin 11 turns on the light indicators 18 and external load when the microcontroller 14 detects a specified condition, such as, a warning condition. The pin 13 is connected to the slope control input of the CAN U2 to provide rise time control of the output data stream.

Figure 3:
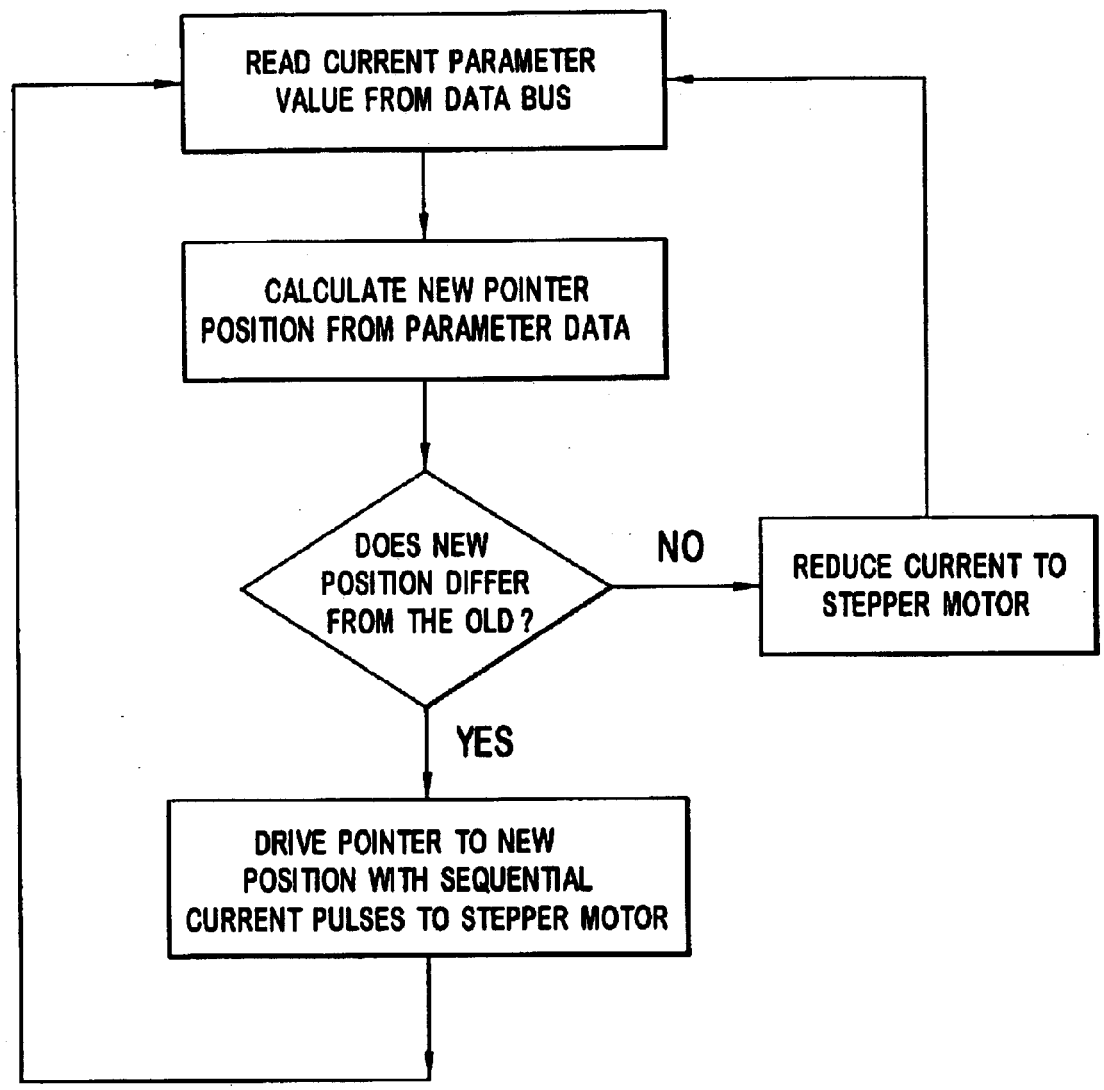
FIG. 3 is a flow diagram for software utilized in the instrument of FIG. 2.

As shown in FIG. 3, the microcontroller software has a power down mode feature to conserve power when the incoming parameter data from the data bus 12 has not deviated in value enough to require motor 16 movement. Power conservation is achieved by applying the same voltage to opposite ends of each of the first and second motor drive coils so that no current flows through the coil. In this process, first a current parameter value is read from the data bus 22 by the microcontroller 14 through the data bus interface 12. The measurement is transferred to the microcontroller 14 at the pin 8. The microcontroller 14 then calculates a new needle position from the parameter data received at the pin 8. If the new position differs from the old position, then the needle is driven to the new position with sequential current pulses to the motor 16 as described above in connection with pins 1, 2, 19, and 20 of the microcontroller 14. If the new position does not differ from the old position, then current to the motor 16 is reduced to maintain the needle at its previous position. The motor 16 and, thus, the needle remains in the last position that it was driven to due to the significant (i.e., 180:1) level of reduction gearing between the motor 16 and the output shaft. The process is then repeated by once again reading the current parameter value from the data bus 22.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A system for displaying monitored measurements of an apparatus, comprising:

a data bus interface coupled to a data bus of the apparatus, the data bus containing measurement data which is monitored by sensors in the apparatus;

a plurality of instruments each having a microcontroller coupled to the data bus interface;

a motor being driven by the microcontroller, an indicator needle being coupled to the motor for displaying a measurement; and the microcontroller including a power down mode feature wherein the microcontroller monitors the rate of change of the measurement being displayed on the instrument and enters into a power down mode when the rate of change is below a given threshold.

2. The system of claim 1, wherein the power down mode feature stops current flow through the motor to conserve power.

3. The system of claim 1, wherein when the rate of change is above the given threshold, sequential current pulses to the motor drive the indicator needle to a new measurement.

4. The system of claim 1, wherein the instrument includes a light indicator coupled to and driven by the microcontroller.

5. The system of claim 4, further comprising an auxiliary output for driving external light indicators and alarms.

6. The system of claim 1, wherein the apparatus is a vehicle.

7. The system of claim 1, wherein the motor is a stepper motor.

8. The system of claim 1, wherein the instrument is a gauge.

9. The system of claim 8, wherein the gauge measures pressure, temperature, liquid level, or rotations per minute.

10. The system of claim 1, wherein the instrument includes illumination from a back light driven by the microcontroller.

11. The system of claim 1, wherein the data bus interface is a SAE J1708 or SAE J1587 interface.

12. The system of claim 1, wherein the data bus interface is a SAE J1939 interface.

13. The system of claim 1, wherein the microcontroller drives current through two drive coils of the motor.

14. A method for displaying monitored measurements of an apparatus, comprising:

providing measurement data to a data bus;

coupling a data bus interface directly to the data bus;

coupling a microcontroller of an instrument directly to the data bus interface;

driving a motor with the microcontroller to display a measurement on the instrument;

monitoring a rate of change of the measurement being displayed on the instrument; and entering a power down mode when the rate of change is below a given threshold.

15. The method of claim 14, further comprising changing the display of the measurement of the instrument when the rate of change is above the given threshold.

16. The method of claim 15, further comprising sending sequential current pulses to the motor to change the display of the measurement.

17. The method of claim 14, further comprising stopping current flow through drive coils of the motor.

18. The method of claim 14, further comprising coupling a light indicator to the microcontroller such that the light indicator turns on when the microcontroller detects a given condition.

19. The method of claim 14, further comprising coupling an auxiliary output to the microcontroller for driving external light indicators and alarms.

20. The method of claim 14, further comprising illuminating the instrument with a back light driven by the microcontroller.

21. The method of claim 14, further comprising driving current through two drive coils of the motor with the microcontroller.

22. A method for displaying monitored measurements of an apparatus, comprising:

provinding measurement data to a data bus;

coupling a data bus interface directly to the data bus;

coupling a microcontroller of an instrument directly to the data bus interface;

driving a motor with the microcontroller to display a measurement on the instrument; and illuminating the instrument with a back light driven by the microcontroller.

23. The method of claim 22, further comprising coupling a light indicator to the microcontroller such that the light indicator turns on when the microcontroller detects a given condition.

24. The method of claim 22, further comprising coupling an auxiliary output to the microcontroller for driving external light indicators and alarms.

25. The method of claim 22, further comprising driving current through two drive coils of the motor with the microcontroller.

26. A system for displaying monitored measurements of an apparatus, comprising:

a data bus interface coupled to a data bus of the apparatus, the data bus containing measurement data which is monitored by sensors in the apparatus;

a plurality of instruments each having a microcontroller coupled to the data bus interface, the instrument including illumination from a back light driven by the microcontroller; and a motor being driven by the microcontroller and an indicator needle being coupled to the motor for displaying a measurement.

27. The system of claim 26, wherein the apparatus is a vehicle.

28. The system of claim 26, wherein the motor is a stepper motor.

29. The system of claim 26, wherein the instrument is a gauge.

30. The system of claim 29, wherein the gauge measures pressure, temperature, liquid level, or rotations per minute.

31. The system of claim 26, wherein the data bus interface is a SAE J1708 or SAE J1587 interface.

32. The system of claim 26, wherein the data bus interface is a SAE J1939 interface.

33. The system of claim 26, wherein the microcontroller drives current through two drive coils of the motor.

* * * * *